(12) United States Patent
Leigh et al.

(10) Patent No.: US 12,385,507 B2
(45) Date of Patent: Aug. 12, 2025

(54) DUAL-SYSTEM HYDRAULIC ACTUATOR

(71) Applicant: Parker-Hannifin Corporation, Cleveland, OH (US)

(72) Inventors: James E. Leigh, Ladera Ranch, CA (US); Gabriel T. Huynh, III, Garden Grove, CA (US); Kong Tran, Lake Forest, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 18/711,654

(22) PCT Filed: Feb. 2, 2023

(86) PCT No.: PCT/US2023/061811
§ 371 (c)(1),
(2) Date: May 20, 2024

(87) PCT Pub. No.: WO2023/158928
PCT Pub. Date: Aug. 24, 2023

(65) Prior Publication Data
US 2025/0012300 A1    Jan. 9, 2025

Related U.S. Application Data

(60) Provisional application No. 63/310,679, filed on Feb. 16, 2022.

(51) Int. Cl.
*F15B 15/14* (2006.01)

(52) U.S. Cl.
CPC ...... *F15B 15/1447* (2013.01); *F15B 15/1466* (2013.01); *F15B 15/149* (2013.01); *F15B 2211/7056* (2013.01)

(58) Field of Classification Search
CPC ............ F15B 15/1447; F15B 15/1466; F15B 11/0365; F15B 20/00; F15B 2211/8757; F15B 2211/7056
See application file for complete search history.

(56) References Cited

U.S. PATENT DOCUMENTS

| 4,296,677 A | 10/1981 | Little et al. |
| 6,817,067 B2 | 11/2004 | Kopp et al. |

(Continued)

FOREIGN PATENT DOCUMENTS

WO        99/45280        9/1999

OTHER PUBLICATIONS

International Search Report and Written Opinion prepared by the European Patent Office in international appellation No. PCT/US2023/061811 dated May 16, 2023.

(Continued)

*Primary Examiner* — Nathaniel E Wiehe
*Assistant Examiner* — Daniel S Collins
(74) *Attorney, Agent, or Firm* — McDonnell Boehnen Hulbert & Berghoff LLP

(57) ABSTRACT

An actuator includes a primary piston and a secondary piston axially movable together in a cylinder assembly; a plurality of chambers comprising: a first chamber, a second chamber, a third chamber, and a fourth chamber, wherein when fluid flows into the first chamber the primary piston extends and when fluid flows into the second chamber the primary piston retracts, wherein an extension fluid force applied by fluid in the third chamber to extend the secondary piston is different from a retraction fluid force applied by fluid in the fourth chamber to retract the secondary piston; and a force-balance chamber configured to receive fluid from the third chamber or the fourth chamber to apply a balancing force on the secondary piston to either oppose (Continued)

fluid force acting on the secondary piston or add to the fluid force acting on the secondary piston, thereby compensating for a difference between the extension fluid force and the retraction fluid force.

11 Claims, 4 Drawing Sheets

(56) References Cited

U.S. PATENT DOCUMENTS

2004/0163386 A1  8/2004  Kopp et al.
2009/0133574 A1  5/2009  Fenny et al.

OTHER PUBLICATIONS

Notice of Reasons for Rejection issued by the Japanese Patent Office in Application No. 2024-543116 prepared Apr. 25, 2025.

900

```
┌─────────────────────────────────────────────────────────────────────┐
│  PROVIDING FLUID TO A FIRST CHAMBER AND A THIRD CHAMBER OF AN ACTUATOR TO │
│  EXTEND A PISTON ROD OF THE ACTUATOR, WHEREIN THE ACTUATOR COMPRISES A    │
│  PRIMARY PISTON AND A SECONDARY PISTON, WHEREIN THE SECONDARY PISTON IS   │
│  COUPLED TO THE PISTON ROD, AND WHEREIN THE PRIMARY PISTON IS SECURED TO  │
│  THE SECONDARY PISTON AND THE PISTON ROD, SUCH THAT THE PRIMARY PISTON,   │──902
│  THE SECONDARY PISTON, AND THE PISTON ROD MOVE TOGETHER AXIALLY, WHEREIN  │
│  PROVIDING FLUID TO THE FIRST CHAMBER CAUSES THE PRIMARY PISTON TO EXTEND,│
│  AND WHEREIN PROVIDING FLUID TO THE THIRD CHAMBER CAUSES AN EXTENSION     │
│           FLUID FORCE TO BE APPLIED TO EXTEND THE SECONDARY PISTON        │
└─────────────────────────────────────────────────────────────────────┘
                                   │
                                   ▼
┌─────────────────────────────────────────────────────────────────────┐
│     PROVIDING FLUID TO A SECOND CHAMBER AND A FOURTH CHAMBER OF THE      │
│    ACTUATOR TO RETRACT THE PISTON ROD OF THE ACTUATOR, WHEREIN PROVIDING │
│     FLUID TO THE SECOND CHAMBER CAUSES THE PRIMARY PISTON TO RETRACT, AND│
│   WHEREIN PROVIDING FLUID TO THE FOURTH CHAMBER CAUSES A RETRACTION FLUID│──904
│       FORCE TO BE APPLIED TO RETRACT THE SECONDARY PISTON, WHEREIN THE   │
│       EXTENSION FLUID FORCE IS DIFFERENT FROM THE RETRACTION FLUID FORCE │
└─────────────────────────────────────────────────────────────────────┘
                                   │
                                   ▼
┌─────────────────────────────────────────────────────────────────────┐
│      PROVIDING FLUID FROM THE THIRD CHAMBER OR THE FOURTH CHAMBER TO A   │
│    FORCE-BALANCE CHAMBER TO APPLY A BALANCING FORCE ON THE SECONDARY     │
│    PISTON TO OPPOSE FLUID FORCE ACTING ON THE SECONDARY PISTON OR ADD TO │
│    THE FLUID FORCE ACTING ON THE SECONDARY PISTON, THEREBY COMPENSATING  │──906
│    FOR A DIFFERENCE BETWEEN THE EXTENSION FLUID FORCE AND THE RETRACTION │
│                                FLUID FORCE                               │
└─────────────────────────────────────────────────────────────────────┘
```

FIG. 4

DUAL-SYSTEM HYDRAULIC ACTUATOR

CROSS REFERENCE TO RELATED APPLICATION

The present application is a U.S. National Phase Application pursuant to 35 U.S.C § 371 of International Application No. PCT/US2023/061811 filed on Feb. 2, 2023, which claims priority to U.S. Provisional patent application No. 63/310,679, filed on Feb. 16, 2022, the entire contents of all of which are herein incorporated by reference as if fully set forth in this description.

BACKGROUND

A hydraulic cylinder actuator includes a cylinder that uses hydraulic power to facilitate mechanical operation. Particularly, a hydraulic cylinder actuator includes a hollow cylindrical tube inside which a piston can slide. The piston can divide the cylinder into two chambers. When pressurized fluid is provided to one chamber, the piston moves. A double acting actuator has a piston that can move in both directions. Any difference in fluid pressure between the two sides of the piston moves the piston inside the cylinder.

Hydraulic actuators can be used in a variety of applications such as controlling implements of hydraulic machinery (e.g., excavators, loaders, etc.) and moving control surfaces of an aircraft. For instance, an aircraft typically includes a plurality of flight control surfaces (fixed wing aircraft) or one or more cyclic pitch control swashplates (rotary aircraft) that, when controllably positioned, guide the movement of the aircraft.

In some critical applications, such as aircraft control systems, it may be desirable to have redundant controls, e.g., multiple actuators for moving a control surface, such that if control of one actuator is lost, the other actuators can safely move the control surface. Further, forces of these actuators can be additive, thereby increasing the force that the actuator can exert.

In some applications, such as military applications, it may further be desirable to configure the actuator to be ballistic-tolerant such that the actuator may continue to work even if parts of it are damaged. It may be desirable to have the actuator be ballistic-tolerant without increasing the weight of the actuator substantially.

It is with respect to these and other considerations that the disclosure made herein is presented.

SUMMARY

The present disclosure describes implementations that relate to a dual-system hydraulic actuator.

In a first example implementation, the present disclosure describes an actuator. The actuator includes: a primary piston that is disposed at least partially within a cylinder assembly; a secondary piston that is disposed at least partially within the cylinder assembly, wherein the primary piston and the secondary piston are configured to move together axially within the cylinder assembly; a plurality of chambers formed within the cylinder assembly and comprising: (i) a first chamber, wherein when fluid flows to the first chamber, the primary piston extends, (ii) a second chamber, wherein when fluid flows to the second chamber, the primary piston retracts, (iii) a third chamber, wherein when fluid flows to the third chamber, the secondary piston extends, (iv) a fourth chamber, wherein when fluid flows to the fourth chamber, the secondary piston retracts, and wherein an extension fluid force applied by fluid in the third chamber to extend the secondary piston is different from a retraction fluid force applied by fluid in the fourth chamber to retract the secondary piston; and a force-balance chamber configured to receive fluid from the third chamber or the fourth chamber to apply a balancing force on the secondary piston to either oppose fluid force acting on the secondary piston or add to the fluid force acting on the secondary piston, thereby compensating for a difference between the extension fluid force and the retraction fluid force.

In a second example implementation, the present disclosure describes a method of operating the actuator of the first example implementation.

In a third example implementation, the present disclosure describes a hydraulic system including a source of fluid, a fluid reservoir, the actuator of the first example implementation, and one or more manifolds controlling fluid flow from the source of fluid to the actuator and from the actuator to the fluid reservoir.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 4 is a flowchart of a method for operating an actuator, in accordance with an example implementation.

DETAILED DESCRIPTION

The present disclosure relates to a dual-system hydraulic actuator. In some applications, multiple hydraulic cylinder actuators can be used to provide redundancy if control of one actuator is lost, and also to increase the force that can be exerted on a member (e.g., a rotor of a helicopter or control surface of a fixed-wing aircraft) being controlled by the actuators.

In one example, an actuator can include two systems staggered in line such that a long cylinder accommodates several pistons, e.g., two pistons coupled to a common rod. In such a configuration, however, it may be difficult to armor such a long cylinder to protect the pistons against ballistic damage. Further, in such an actuator damage to one system can propagate to the other system, leading to loss of control of the entire actuator.

In another example, an actuator can include three separate pistons, where a central piston is controlled by one system, and two outer pistons, one on each side of the central piston, are controlled by a second system. In this example, if the system associated with the central piston does not work, the second system can operate the other two pistons to enable the actuator to continue working. While damage to one system might not propagate to the other system, such a configuration leads to a large package, which may be undesirable in some applications. Further, armoring three separate cylinder can cause the actuator to much heavier.

Further, in such a three-piston configuration, the pistons are coupled to a common yoke. The outer two pistons have an indirect load path acting on the yoke, which may lead to a reduced stiffness, rendering the actuator more susceptible to damage from vibration. Further, mismatch in force between the outer pistons can lead to bending and side loading.

It may thus be desirable to have a dual-system hydraulic actuator that provides redundancy. Further, it may be desirable for such dual-system actuator to preclude propagation of damage from one system to another. This way, if one system fails, the other system can continue to work. It may also be desirable to have such dual-system actuator configured in a smaller package (e.g., smaller end-to-end length) compared to a three-piston configuration. Such actuator can have higher stiffness, leading to enhanced vibration performance.

Figure 1:
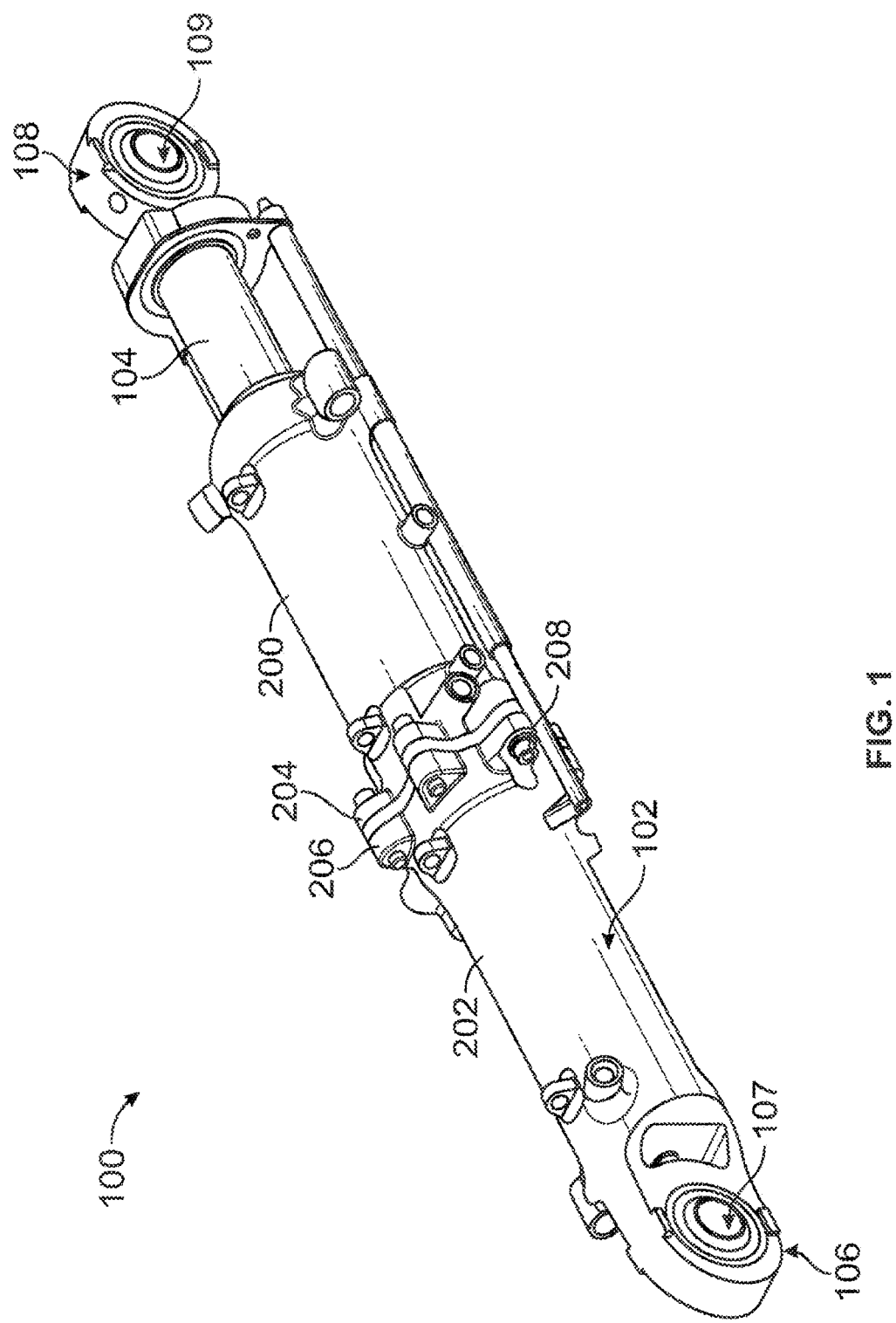
FIG. 1 illustrates a perspective view of an actuator, in accordance with an example implementation.

FIG. 1 illustrates a perspective view of an actuator 100, in accordance with an example implementation. The actuator 100 can include a cylinder assembly 102 and a piston rod 104. The piston rod 104 is slidably-accommodated within the cylinder assembly 102. The term "slidably accommodated" is used herein to indicate that a first component (e.g., a piston) is positioned relative to a second component (e.g., a cylinder) with sufficient clearance therebetween, enabling movement of the first component relative to the second component in the proximal and distal directions.

A proximal end of the cylinder assembly 102 has a connection portion 106 having a hole 107 through which a pin can be disposed to couple the cylinder assembly 102 to a frame or structure (e.g., to a frame of an aircraft). Similarly, a distal end of the piston rod 104 has a connection portion 108 having a hole 109 through which a pin can be disposed to couple the piston rod 104 to a movable member, such as a control surface of an aircraft or a rotor of a helicopter.

In an example implementation, the cylinder assembly 102 can include a primary cylinder 200 and a secondary cylinder 202. The primary cylinder 200 is separate from the secondary cylinder 202.

The primary cylinder 200 can have a flange 204, and the secondary cylinder 202 can have a respective flange 206. The flange 204 is coupled to the flange 206 via a plurality of fasteners (e.g., bolts) such as fastener 208, disposed in a circular array about the cylinder assembly 102. Beneficially, as the cylinder assembly 102 comprises two separate cylinders, if one of them (e.g., the primary cylinder 200) is damaged, the other cylinder (e.g., the secondary cylinder 202) may remain operational.

Figure 2:
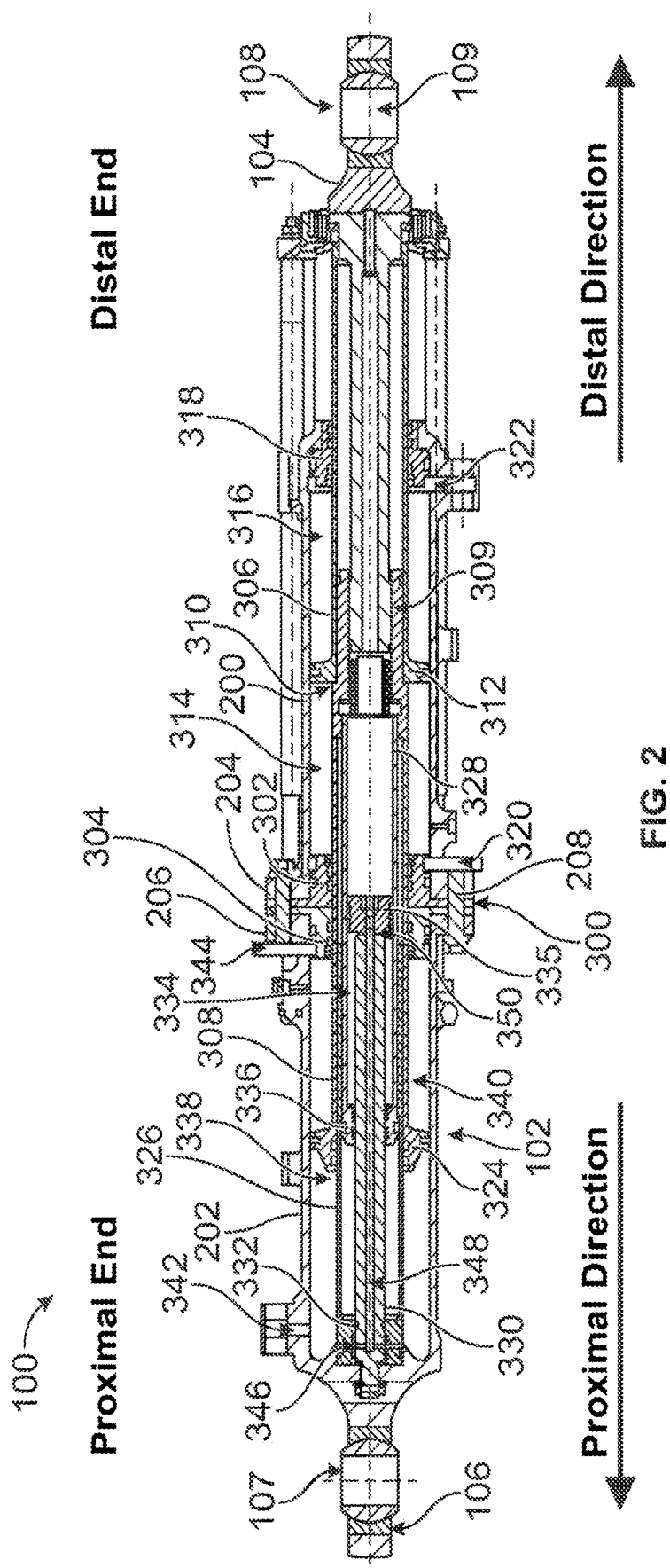
FIG. 2 illustrates a cross-sectional side view of the actuator of FIG. 1, in accordance with another example implementation.
Figure 3:
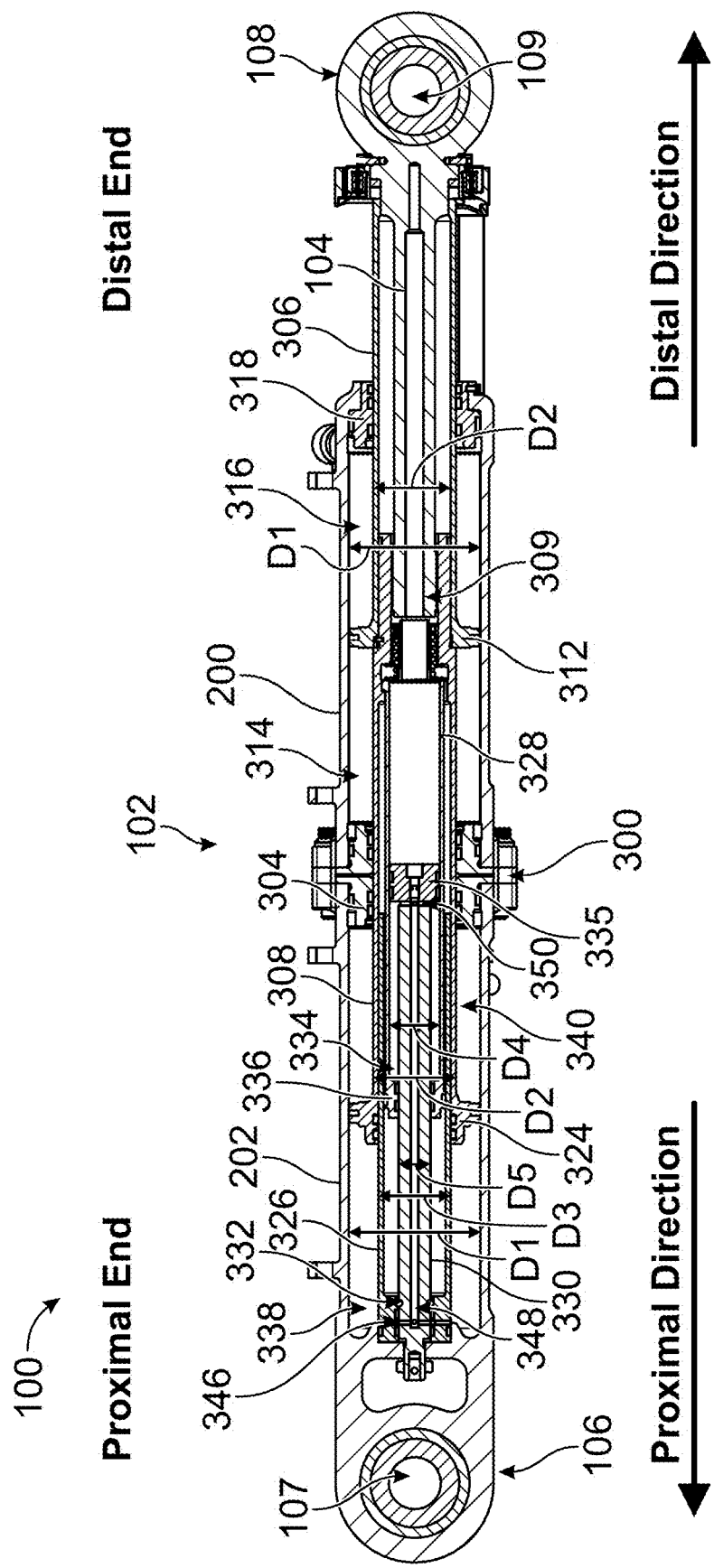
FIG. 3 illustrates another cross-sectional side view of the actuator of FIG. 1, in accordance with an example implementation.

FIG. 2 illustrates a cross-sectional side view of the actuator 100, and FIG. 3 illustrates another cross-sectional side view of the actuator 100, in accordance with an example implementation. The cross-section of FIG. 3 is taken across a plane that is perpendicular to the plane of the cross-sectional view of FIG. 2.

The actuator 100 has a central gland 300 disposed at the interface between the primary cylinder 200 and the secondary cylinder 202. In an example, the central gland 300 can include two portions, a first gland portion 302 and a second gland portion 304. The central gland 300 separates the primary cylinder 200 and the secondary cylinder 202, and is coupled thereto via the fasteners (e.g., the fastener 208) that couple the primary cylinder 200 to the secondary cylinder 202.

The central gland 300 operates as a seal carrier. For example, the central gland 300 can have several internal annular grooves in which seals (e.g., O-rings, T-seals, etc.) can be disposed. This allows slidable components such as pistons to move relative to the central gland 300, while sealing fluid chambers from each other. Further, as described in more detail below, the central gland 300 isolates a first system controlling a primary piston from a second system controlling a secondary piston.

The primary cylinder 200 and the secondary cylinder 202 together form a cylindrical cavity therein in which a primary piston 306 and a secondary piston 308 are, at least partially, disposed. The primary piston 306 and the secondary piston 308 are axially-movable within the cylinder assembly 102.

The primary piston 306 and the secondary piston 308 are both hollow. Particularly, the primary piston 306 has a longitudinal cylindrical cavity formed therein in which a portion of the secondary piston 308 is disposed and through which a portion of the piston rod 104 is disposed as well.

The secondary piston 308 is coupled to the piston rod 104 such that the secondary piston 308 and the piston rod 104 move together. For example, the piston rod 104 can have threads formed on its exterior surface at its proximal end, and the secondary piston 308 can have corresponding threads formed in its interior surface at its distal end. This way, the piston rod 104 can be threaded to the secondary piston 308 at threaded region 309.

Further, a proximal end of the primary piston 306 rests against or interfaces with a shoulder 310 formed by the secondary piston 308, while a distal end of the primary piston 306 interfaces with the piston rod 104. This way, the primary piston 306, the secondary piston 308, and the piston rod 104 move together. Particularly, if a force is applied to the primary piston 306, such force is transmitted to the secondary piston 308 and the piston rod 104 as well. If a force is applied to the secondary piston 308, such force is transmitted to the primary piston 306 and the piston rod 104 as well.

The primary piston 306 has a piston head 312 on which fluid acts (i.e., applies a fluid force) to move the primary piston 306. The primary piston 306 is slidably-accommodated within the primary cylinder 200, such that the piston head 312 slides along the interior surface of the primary cylinder 200 as the primary piston 306 moves axially.

As depicted in FIGS. 2-3, a first chamber 314 is formed between, or bounded by, an exterior peripheral surface of the secondary piston 308 and an interior peripheral surface of the primary cylinder 200, and between the piston head 312 and the first gland portion 302. The first chamber 314 is an annular chamber as depicted. When pressurized fluid is provided to the first chamber 314, the primary piston 306 extends. The term "extend" or "extension" is used herein to refer to movement in the distal direction (e.g., to the right in FIGS. 2-3), whereas the term "retract" or "retraction" is used herein to refer to movement in the proximal direction (e.g., to the left in FIGS. 2-3).

Further, a second chamber 316 is formed between, or bounded by, an exterior peripheral surface of the primary piston 306 and an interior peripheral surface of the primary cylinder 200, and between the piston head 312 and an end gland 318. The second chamber 316 is also an annular chamber. When pressurized fluid is provided to the second chamber 316, the primary piston 306 retracts.

The end gland 318 is disposed at a distal end of the primary cylinder 200 between the primary piston 306 and the primary cylinder 200. The end gland 318 can have internal annular grooves in which seals are disposed. This way, the primary piston 306 can move or slide axially relative to the end gland 318, while the seals preclude leakage from the second chamber 316 to the external environment of the actuator 100. The second chamber 316 is referred to as a retraction chamber because when pressurized fluid is provided thereto, the primary piston 306 retracts.

The actuator 100 has a first port 320 formed in the primary cylinder 200 and configured to provide fluid to and receive fluid from the first chamber 314. The actuator 100 further has a second port 322 formed in the primary cylinder 200 and configured to provide fluid to and receive fluid from the second chamber 316.

For example, if pressurized fluid is provided from a source of fluid (e.g., a pump) through the first port 320 to the first chamber 314, the fluid applies a fluid force on the piston head 312 in the distal direction, and the primary piston 306 extends (moves in the distal direction). Fluid discharged from the second chamber 316 as the primary piston 306 extends flows through the second port 322 to a fluid reservoir, for example.

On the other hand, if pressurized fluid is provided from the source of fluid through the second port 322 to the second chamber 316, the fluid applies a fluid force on the piston head 312 in the proximal direction, and the primary piston 306 retracts (moves in the proximal direction). The primary piston 306 can retract (i.e., move in the proximal direction) until it reaches the first gland portion 302 of the central gland 300 (i.e., bottoming of the primary piston 306 during retraction takes place as it reaches the first gland portion 302).

Fluid discharged from the first chamber 314 as the primary piston 306 retracts flows through the first port 320 to the fluid reservoir. As mentioned above, movement of the primary piston 306 causes the piston rod 104 and the secondary piston 308 to move therewith.

Referring to FIG. 3, an outer diameter of the piston head 312 of the primary piston 306 (or inner diameter of the primary cylinder 200) is labelled "$D_1$," while the outer diameter of the rest of the primary piston 306 is labelled "$D_2$." An outer diameter of the secondary piston 308 through a portion that bounds the first chamber 314 is also equal to $D_2$. With this configuration, the annular surface area of the primary piston 306 in the first chamber 314 on which fluid acts to extend the primary piston 306 is equal to the annular surface area of the primary piston 306 in the second chamber 316 on which fluid acts to retract the primary piston 306.

Thus, the primary piston 306 is balanced, i.e., the fluid force acting on the primary piston 306 when extending is equal to the fluid force acting on the primary piston 306 when retracting. Assuming pressure level of supply fluid provided to the first chamber 314 is $P_S$, while return fluid in (fluid being discharged from) the second chamber 316 is $P_R$, then the fluid force acting on the primary piston 306, whether the primary piston 306 is extending or retracting, is $$F_1 = P_S\left(\pi\frac{D_1^2}{4} - \pi\frac{D_2^2}{4}\right) - P_R\left(\pi\frac{D_1^2}{4} - \pi\frac{D_2^2}{4}\right) = (P_S - P_R)\cdot\left(\pi\frac{D_1^2}{4} - \pi\frac{D_2^2}{4}\right).$$

As an example, the supply pressure level $P_S$ can be a high pressure level such as 3000-5000 psi, whereas the return pressure level $P_R$ can be a low pressure level, e.g., 50-100 psi.

The primary cylinder 200, the primary piston 306, and the associated fluid chambers can be considered a first system that controls extension and retraction of the piston rod 104. The actuator 100 further has a second system that includes the secondary piston 308 and associated fluid chambers that controls extension and retraction of the piston rod 104 (via the secondary piston 308). This way, the actuator 100 is a dual-system actuator where if one system does not work, another system can safely operate the movable member (e.g., aircraft control surface or rotor) being controlled by the actuator 100.

The secondary piston 308 has a piston head 324 on which fluid acts (i.e., applies a fluid force) to move the secondary piston 308. The secondary piston 308 is slidably-accommodated within the secondary cylinder 202, such that the piston head 324 slides along the interior surface of the secondary cylinder 202 as the secondary piston 308 moves axially.

The secondary piston 308 is hollow as depicted in FIGS. 2-3 and includes a longitudinal cylindrical cavity formed therein. The actuator 100 includes a balance tube 326, an inner cylinder 328, and a static piston 330 that are received, at least partially, within the longitudinal cylindrical cavity of the secondary piston 308.

The static piston 330 is coupled to the secondary cylinder 202 such that the static piston 330 remains stationary or fixedly-disposed within the secondary cylinder 202. For instance, a proximal end of the static piston 330 can be threaded into or retained by a retaining ring to the secondary cylinder 202.

The balance tube 326 is coupled to the static piston 330 via a retaining ring 332 (e.g., a wire ring or a retaining O-ring), such that the balance tube 326 also remains stationary. The inner cylinder 328 is slidable about an exterior surface of the static piston 330. Particularly, the inner cylinder 328 is slidably-accommodated between the balance tube 326 and the static piston 330 such that the inner cylinder 328 can move axially relative to the balance tube 326 and the static piston 330.

A force-balance chamber 334 is formed between the exterior peripheral surface of the static piston 330 and the interior peripheral surface of the inner cylinder 328, between an enlarged distal end 335 of the static piston 330 and a proximal end 336 of the inner cylinder 328. The proximal end 336 of the inner cylinder 328 has external grooves and internal grooves in which seals can be disposed to preclude fluid leakage from the force-balance chamber 334 as the inner cylinder 328 moves axially about the exterior surface of the static piston 330. As depicted in FIGS. 2-3, the balance tube 326 is interposed (radially) between the inner cylinder 328 and the secondary piston 308. The secondary piston 308 is configured to move axially about the exterior surface of the balance tube 326 as the secondary piston 308 extends or retracts.

Further, as depicted in FIGS. 2-3, a third chamber 338 is formed between, or bounded by, an exterior peripheral surface of the balance tube 326 and an interior peripheral surface of the secondary cylinder 202, and between the piston head 324 and an interior proximal surface of the secondary cylinder 202. Also, a fourth chamber 340 is formed between, or bounded by, an exterior peripheral surface of the secondary piston 308 and an interior peripheral surface of the secondary cylinder 202, and between the piston head 324 and the second gland portion 304 of the central gland 300.

Both the third chamber 338 and the fourth chamber 340 are annular. When pressurized fluid is provided to the third chamber 338, the secondary piston 308 extends. On the other hand, when pressurized fluid is provided to the fourth chamber 340, the secondary piston 308 retracts.

The piston head 324 can have an external annular groove in which a seal is disposed. This way, the secondary piston 308 can move or slide axially, while the seals preclude leakage between fourth chamber 340 and the third chamber 338.

The actuator 100 further has a third port 342 formed in the secondary cylinder 202 and configured to provide fluid to and receive fluid from the third chamber 338. The actuator 100 also has a fourth port 344 formed in the secondary cylinder 202 and configured to provide fluid to and receive fluid from the fourth chamber 340.

If pressurized fluid is provided through the third port 342 to the third chamber 338, the fluid applies a fluid force on the piston head 324 in the distal direction, and the secondary piston 308 extends (moves in the distal direction). The secondary piston 308 can extend (i.e., move in the distal direction) until it reaches the second gland portion 304 of the central gland 300 (i.e., bottoming of the secondary piston 308 during extension takes place as it reaches the second gland portion 304). Fluid discharged from the fourth chamber 340 as the secondary piston 308 extends flows through the fourth port 344 to a fluid reservoir.

On the other hand, if pressurized fluid is provided through the fourth port 344 to the fourth chamber 340, the fluid applies a fluid force on the piston head 324 in the proximal direction, and the secondary piston 308 retracts (moves in the proximal direction). Fluid discharged from the third chamber 338 as the secondary piston 308 retracts flows through the third port 342 to the fluid reservoir. As mentioned above, as the secondary piston 308 moves, the piston rod 104 and the primary piston 306 move therewith.

Referring to FIG. 3, an outer diameter of the piston head 324 of the secondary piston 308 (or interior diameter of the secondary cylinder 202) is labelled "$D_1$," and the outer diameter of the rest of the secondary piston 308 is labelled "$D_2$." An outer diameter of the balance tube 326 is labelled "$D_3$," which is smaller than $D_2$. With this configuration, the annular surface area of the secondary piston 308 in the third chamber 338 on which fluid acts to extend the secondary piston 308 is larger than the annular surface area of the secondary piston 308 in the fourth chamber 340 on which fluid acts to retract the secondary piston 308. As such, an extension fluid force applied by fluid in the third chamber 338 to extend the secondary piston 308 is different from a retraction fluid force applied by fluid in the fourth chamber 340 to retract the secondary piston 308.

Assuming that pressure level of fluid provided to the third chamber 338 to extend the secondary piston 308 is $P_S$, whereas the pressure level in the fourth chamber 340 is $P_R$, then the extension fluid force acting on the secondary piston 308 in the distal direction is $$F_{2E} = P_S\left(\pi\frac{D_1^2}{4} - \pi\frac{D_3^2}{4}\right) - P_R\left(\pi\frac{D_1^2}{4} - \pi\frac{D_2^2}{4}\right).$$

On the other hand, assuming that pressure level of fluid provided to the fourth chamber 340 to retract the secondary piston 308 is $P_S$, whereas the pressure level in the third chamber 338 is $P_R$, then the retraction fluid force acting on the secondary piston 308 in the distal direction is $$F_{2R} = P_S\left(\pi\frac{D_1^2}{4} - \pi\frac{D_2^2}{4}\right) - P_R\left(\pi\frac{D_1^2}{4} - \pi\frac{D_3^2}{4}\right).$$

As mentioned above, the supply pressure level $P_S$ can be a high pressure level such as 3000-5000 psi, whereas the return pressure level $P_R$ can be a low pressure level, e.g., 50-100 psi.

Because $D_2$ is larger than $D_3$, then the extension fluid force is greater than the retraction fluid force, i.e., $F_{2E}>F_{2R}$. The actuator 100, however, is configured to make up or compensate for the difference between $F_{2E}>F_{2R}$ to balance the secondary piston 308.

The static piston 330 has a first set of cross-holes 346, a longitudinal channel 348 formed therein, and a second set of cross-holes 350. The term "hole" is used generally herein to indicate a hollow place (e.g., cavity) in a solid body or surface, for example. The term "cross-hole" is used herein to encompass any type of opening (e.g., slot, window, hole, etc.) that crosses a path of, or is formed transverse relative to, another hole, cavity, or channel.

With this configuration, fluid provided to the third chamber 338 is communicated through the first set of cross-holes 346, the longitudinal channel 348, and the second set of cross-holes 350 to the force-balance chamber 334. Thus, pressurized fluid in the third chamber 338 applying a fluid force on the secondary piston 308 in the distal direction, also applies a force on the inner cylinder 328 in the proximal direction. The inner cylinder 328 is coupled to the secondary piston 308, and therefore the force acting on the inner cylinder 328 in the proximal direction is transmitted to the secondary piston 308 and opposes the fluid force acting on the secondary piston 308 in the distal direction.

The inner cylinder 328 is locked to the secondary piston 308. Any locking or coupling mechanism can be used. As such, axial forces applied to the inner cylinder 328 are transmitted to the secondary piston 308 and vice versa. Further, the actuator 100 can include an anti-rotation feature (e.g., a pin) that precludes the primary piston 306 from rotating relative to the secondary piston 308 as they both move axially within the cylinder assembly 102.

Referring back to FIG. 3, the inner diameter of the inner cylinder 328 is labelled "$D_4$," and the outer diameter of the static piston 330 is labelled "$D_5$." Referring to FIGS. 2-3 together, during extension of the secondary piston 308, fluid communicated to the force-balance chamber 334 applies a fluid force on the proximal end 336 of the inner cylinder 328 in the proximal direction. The fluid force acting on the inner cylinder 328 in the proximal direction can be referred to as a balancing force and is determined as $$F_B = P_S\left(\pi\frac{D_4^2}{4} - \pi\frac{D_5^2}{4}\right).$$

Notably, the inner cylinder 328 and the static piston 330 are configured such that $D_4$ and $D_5$ render the balancing force $F_B$ equal to the difference between $F_{2E}$ and $F_{2R}$. In other words, $F_B=F_{2E}-F_{2R}$.

As such, the secondary piston 308 is balanced. When the secondary piston 308 extends, the balancing force $F_B$ opposes the extension force $F_{2E}$, thereby reducing $F_{2E}$ to be equal to the retraction force $F_{2R}$.

Although in the example implementation illustrated in the Figures, pressurized fluid provided to the third chamber 338 is communicated to the force-balance chamber 334 to oppose extension of the secondary piston 308, other configurations are possible. For example, rather than communicating fluid from the third chamber 338 to the force-balance chamber 334, the actuator 100 can be configured such that fluid from the fourth chamber 340 is communicated to the force-balance chamber 334. In this example, when the secondary piston retracts, the balancing force $F_B$ applied to the inner cylinder 328 via fluid in the force-balance chamber 334 is an additive force that is summed to the retraction force $F_{2R}$ of fluid in the fourth chamber 340, such that $F_B + F_{2R} = F_{2E}$.

As such, the actuator 100 can be configured to either provide fluid from the third chamber 338 or from the fourth chamber 340 to the force-balance chamber 334. In the first case, the force acting on the inner cylinder 328 opposes the extension force $F_{2E}$ acting on the secondary piston 308, and in the second case, the force acting on the inner cylinder 328 is additive to the retraction force $F_{2R}$ acting on the secondary piston 308.

Thus, the actuator 100 is configured as a dual system actuator. If a first system stops working under any condition, a second system may continue working to move the piston rod 104. This way, the actuator 100 provides for redundancy. Further, the force applied to the secondary piston 308 is additive to the fore applied to the primary piston 306. In other words, pressurized fluid can be provided simultaneously to the first chamber 314 and the third chamber 338 to extend both the primary piston 306 and the secondary piston 308, where the forces applied by both pistons 306, 308 on the piston rod 104 are added. Similarly, pressurized fluid can be provided simultaneously to the second chamber 316 and the fourth chamber 340 to retract both the primary piston 306 and the secondary piston 308, where the forces applied by both pistons 306, 308 on the piston rod 104 are added.

The configuration of the actuator 100 may offer several benefits over existing actuators. For example, the actuator 100 has two system for redundancy. A first hydraulic system (e.g., the first chamber 314, the second chamber 316, the first port 320, the second port 322, etc.) operates the primary piston 306 to move the piston rod 104. At the same time, a second hydraulic system (e.g., the third chamber 338, the fourth chamber 340, the third port 342, the fourth port 344, etc.) operates the secondary piston 308, which is coupled to the piston rod 104 and the primary piston 306. If one system is damaged, the other system may continue working, thus providing a redundant configuration.

Further, the actuator 100 is configured such that damage to one system might not propagate to the other. For example, the primary cylinder 200 is separate from the secondary cylinder 202. Thus, if one cylinder is damaged, the other might not be. Particularly, if one cylinder is cracked, such a crack might not propagate to the other cylinder as the two cylinders are separated by the central gland 300, which is composed of two separate portions (i.e., the first gland portion 302 and the second gland portion 304). In other words, the crack is interrupted. Similarly, the primary piston 306 is a separate component from the secondary piston 308. Thus, if one piston is damaged or cracked, such a crack might not propagate to the other piston.

In an example, the end gland 318 may be configured as a frangible gland or component. As such, if the end gland 318 is damaged, as the primary piston 306 moves, the end gland 318 may disintegrate (e.g., may be fragmented) such that the primary piston 306 is not jammed. Even though damaging the end gland 318 may cause leakage and failure of the hydraulic system controlling the primary piston 306, the hydraulic system controlling the secondary piston 308 might continue working, allowing the secondary piston 308 to safely position the piston rod 104. Similarly, the first gland portion 302 and the second gland portion 304 of the central gland 300 may also be made as frangible components.

In an example, to provide further protection against ballistic fragments that could damage the actuator 100, one of the cylinders 200, 202 may be armored (e.g., made of thick hardened steel that can withstand ballistic objects). Armoring one cylinder instead of both reduces the weight of the actuator 100. At the same time, if the non-armored cylinder is damaged, the armored cylinder may continue protecting the respective piston and hydraulic system to enable the actuator 100 to continue functioning.

Further, the configuration of the actuator 100 with, at least partially, concentric pistons, may render the actuator 100 stiffer compared to an actuator having three side-by-side pistons. Higher stiffness may render the actuator 100 more tolerant of vibrations. Further, the actuator 100 might not suffer from side loading or bending issues associated with a three-piston actuator.

FIG. 4 is a flowchart of a method 900 for operating an actuator, in accordance with an example implementation. For example, the method 900 can be used for operating the actuator 100.

The method 900 may include one or more operations, or actions as illustrated by one or more of blocks 902-906. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 902, the method 900 includes providing fluid to the first chamber 314 and the third chamber 338 of the actuator 100 to extend the piston rod 104 of the actuator 100, wherein the actuator 100 comprises the primary piston 306 and the secondary piston 308, wherein the secondary piston 308 is coupled to the piston rod 104, and wherein the primary piston 306 is secured to the secondary piston 308 and the piston rod 104, such that the primary piston 306, the secondary piston 308, and the piston rod 104 move together axially, wherein providing fluid to the first chamber 314 causes the primary piston 306 to extend, and wherein providing fluid to the third chamber 338 causes an extension fluid force to be applied to extend the secondary piston 308.

At block 904, the method 900 includes providing fluid to the second chamber 316 and the fourth chamber 340 of the actuator 100 to retract the piston rod 104 of the actuator 100, wherein providing fluid to the second chamber 316 causes the primary piston 306 to retract, and wherein providing fluid to the fourth chamber 340 causes a retraction fluid force to be applied to retract the secondary piston 308, wherein the extension fluid force is different from the retraction fluid force.

At block 906, the method 900 includes providing fluid from the third chamber 338 or the fourth chamber 340 to the force-balance chamber 334 to apply a balancing force on the secondary piston 308 to oppose fluid force acting on the secondary piston 308 or add to the fluid force acting on the secondary piston 308, thereby compensating for a difference between the extension fluid force and the retraction fluid force.

The method can include other operations described herein.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE1 is an actuator comprising: a primary piston that is disposed at least partially within a cylinder assembly; a secondary piston that is disposed at least partially within the cylinder assembly, wherein the primary piston and the secondary piston are configured to move together axially within the cylinder assembly; a plurality of chambers formed within the cylinder assembly and comprising: (i) a first chamber, wherein when fluid flows to the first chamber, the primary piston extends, (ii) a second chamber, wherein when fluid flows to the second chamber, the primary piston retracts, (iii) a third chamber, wherein when fluid flows to the third chamber, the secondary piston extends, (iv) a fourth chamber, wherein when fluid flows to the fourth chamber, the secondary piston retracts, and wherein an extension fluid force applied by fluid in the third chamber to extend the secondary piston is different from a retraction fluid force applied by fluid in the fourth chamber to retract the secondary piston; and a force-balance chamber configured to receive fluid from the third chamber or the fourth chamber to apply a balancing force on the secondary piston to either oppose fluid force acting on the secondary piston or add to the fluid force acting on the secondary piston, thereby compensating for a difference between the extension fluid force and the retraction fluid force.

EEE 2 is the actuator of EEE 1, wherein the cylinder assembly comprises: a primary cylinder; and a secondary cylinder coupled to the primary cylinder, wherein the primary cylinder and the secondary cylinder form a longitudinal cylindrical cavity in which the primary piston and the secondary piston are axially-movable.

EEE 3 is the actuator of EEE 2, wherein the primary cylinder has a flange, wherein the secondary cylinder has a respective flange, and wherein the actuator further comprises: a central gland disposed between the flange of the primary cylinder and the respective flange of the secondary cylinder; and a plurality of fasteners coupling the flange of the primary cylinder, the respective flange of the secondary cylinder, and the central gland to each other.

EEE 4 is the actuator of EEE 3, wherein the central gland comprises: a first gland portion interfacing with the flange of the primary cylinder; and a second gland portion separate from the first gland portion and interfacing with the respective flange of the secondary cylinder.

EEE 5 is the actuator of any of EEEs 1-4, further comprising: a piston rod disposed partially within the cylinder assembly and coupled to the secondary piston, wherein the primary piston is secured between the secondary piston and the piston rod, such that the primary piston, the secondary piston, and the piston rod move axially together.

EEE 6 is the actuator of any of EEEs 1-5, further comprising: a static piston that is coupled to the cylinder assembly such that the static piston remains stationary; and an inner cylinder that is coupled to the secondary piston and slidable about an exterior surface of the static piston, wherein the force-balance chamber is formed between the exterior surface of the static piston and an interior surface of the inner cylinder, such that the balancing force is applied to the inner cylinder, which transmits the balancing force to the secondary piston.

EEE 7 is the actuator of EEE 6, wherein the force-balance chamber is fluidly-coupled to the third chamber via a longitudinal channel and one or more cross-holes formed in the static piston, such that the force-balance chamber receives fluid from the third chamber as the secondary piston extends, wherein fluid in the force-balance chamber applies the balancing force on the secondary piston to oppose the extension fluid force applied to the secondary piston by fluid in the third chamber.

EEE 8 is the actuator of any of EEEs 6-7, wherein the force-balance chamber is fluidly-coupled to the fourth chamber, such that the force-balance chamber receives fluid from the fourth chamber as the secondary piston retracts, wherein fluid in the force-balance chamber applies the balancing force on the secondary piston as an additive force to the retraction fluid force applied to the secondary piston by fluid in the fourth chamber.

EEE 9 is the actuator of any of EEEs 6-8, further comprising: a balance tube that is coupled to the static piston and interposed radially between the inner cylinder and the secondary piston, wherein the secondary piston is configured to move axially about an exterior surface of the balance tube as the secondary piston extends or retracts.

EEE 10 is a method comprising: providing fluid to a first chamber and a third chamber of an actuator to extend a piston rod of the actuator, wherein the actuator comprises a primary piston and a secondary piston, wherein the secondary piston is coupled to the piston rod, and wherein the primary piston is secured to the secondary piston and the piston rod, such that the primary piston, the secondary piston, and the piston rod move together axially, wherein providing fluid to the first chamber causes the primary piston to extend, and wherein providing fluid to the third chamber causes an extension fluid force to be applied to extend the secondary piston; providing fluid to a second chamber and a fourth chamber of the actuator to retract the piston rod of the actuator, wherein providing fluid to the second chamber causes the primary piston to retract, and wherein providing fluid to the fourth chamber causes a retraction fluid force to be applied to retract the secondary piston, wherein the extension fluid force is different from the retraction fluid force; and providing fluid from the third chamber or the fourth chamber to a force-balance chamber to apply a balancing force on the secondary piston to oppose fluid force acting on the secondary piston or add to the fluid force acting on the secondary piston, thereby compensating for a difference between the extension fluid force and the retraction fluid force.

EEE 11 is the method of EEE 10, wherein the actuator further comprises: (i) a cylinder assembly in which the primary piston and the secondary piston are axially-movable, (ii) a static piston that is coupled to the cylinder assembly, such that the static piston remains stationary, and (iii) an inner cylinder that is coupled to the secondary piston and slidable about an exterior surface of the static piston, wherein applying the balancing force on the secondary piston comprises: applying the balancing force to the inner cylinder, which transmits the balancing force to the secondary piston.

EEE 12 is the method of EEE 11, wherein providing fluid to the force-balance chamber comprises: providing fluid from the third chamber through one or more cross-holes and a longitudinal channel formed in the static piston to the force-balance chamber as the secondary piston extends; and applying the balancing force on the secondary piston to oppose the extension fluid force applied to the secondary piston by fluid in the third chamber.

EEE 13 is the method of any of EEEs 11-12, wherein providing fluid to the force-balance chamber comprises: providing fluid from the fourth chamber to the force-balance chamber as the secondary piston retracts; and applying the balancing force on the secondary piston as an additive force to the retraction fluid force applied to the secondary piston by fluid in the fourth chamber.

What is claimed is:

1. An actuator comprising:
a primary piston that is disposed at least partially within a cylinder assembly;
a secondary piston that is disposed at least partially within the cylinder assembly, wherein the primary piston and the secondary piston are configured to move together axially within the cylinder assembly;
a plurality of chambers formed within the cylinder assembly and comprising: (i) a first chamber, wherein when fluid flows to the first chamber, the primary piston extends, (ii) a second chamber, wherein when fluid flows to the second chamber, the primary piston retracts, (iii) a third chamber, wherein when fluid flows to the third chamber, the secondary piston extends, (iv) a fourth chamber, wherein when fluid flows to the fourth chamber, the secondary piston retracts, and wherein an extension fluid force applied by fluid in the third chamber to extend the secondary piston is different from a retraction fluid force applied by fluid in the fourth chamber to retract the secondary piston; and
a force-balance chamber configured to receive fluid to apply a balancing force on the secondary piston, thereby compensating for a difference between the extension fluid force and the retraction fluid force.

2. The actuator of claim 1, wherein the cylinder assembly comprises:
a primary cylinder; and
a secondary cylinder coupled to the primary cylinder, wherein the primary cylinder and the secondary cylinder form a longitudinal cylindrical cavity in which the primary piston and the secondary piston are axially-movable.

3. The actuator of claim 2, wherein the primary cylinder has a flange, wherein the secondary cylinder has a respective flange, and wherein the actuator further comprises:
a central gland disposed between the flange of the primary cylinder and the respective flange of the secondary cylinder; and
a plurality of fasteners coupling the flange of the primary cylinder, the respective flange of the secondary cylinder, and the central gland to each other.

4. The actuator of claim 3, wherein the central gland comprises:
a first gland portion interfacing with the flange of the primary cylinder; and
a second gland portion separate from the first gland portion and interfacing with the respective flange of the secondary cylinder.

5. The actuator of claim 1, further comprising:
a piston rod disposed partially within the cylinder assembly and coupled to the secondary piston, wherein the primary piston is secured between the secondary piston and the piston rod, such that the primary piston, the secondary piston, and the piston rod move axially together.

6. The actuator of claim 1, further comprising:
a static piston that is coupled to the cylinder assembly such that the static piston remains stationary; and
an inner cylinder that is coupled to the secondary piston and slidable about an exterior surface of the static piston, wherein the force-balance chamber is formed between the exterior surface of the static piston and an interior surface of the inner cylinder, such that the balancing force is applied to the inner cylinder, which transmits the balancing force to the secondary piston.

7. The actuator of claim 6, wherein the force-balance chamber is fluidly-coupled to the third chamber via a longitudinal channel and one or more cross-holes formed in the static piston, such that the force-balance chamber receives fluid from the third chamber as the secondary piston extends, wherein fluid in the force-balance chamber applies the balancing force on the secondary piston to oppose the extension fluid force applied to the secondary piston by fluid in the third chamber.

8. The actuator of claim 6, further comprising:
a balance tube that is coupled to the static piston and interposed radially between the inner cylinder and the secondary piston, wherein the secondary piston is configured to move axially about an exterior surface of the balance tube as the secondary piston extends or retracts.

9. A method comprising:
providing fluid to a first chamber and a third chamber of an actuator to extend a piston rod of the actuator, wherein the actuator comprises a primary piston and a secondary piston, wherein the secondary piston is coupled to the piston rod, and wherein the primary piston is secured to the secondary piston and the piston rod, such that the primary piston, the secondary piston, and the piston rod move together axially, wherein providing fluid to the first chamber causes the primary piston to extend, and wherein providing fluid to the third chamber causes an extension fluid force to be applied to extend the secondary piston;
providing fluid to a second chamber and a fourth chamber of the actuator to retract the piston rod of the actuator, wherein providing fluid to the second chamber causes the primary piston to retract, and wherein providing fluid to the fourth chamber causes a retraction fluid force to be applied to retract the secondary piston, wherein the extension fluid force is different from the retraction fluid force; and
providing fluid to a force-balance chamber to apply a balancing force on the secondary piston, thereby compensating for a difference between the extension fluid force and the retraction fluid force.

10. The method of claim 9, wherein the actuator further comprises: (i) a cylinder assembly in which the primary piston and the secondary piston are axially-movable, (ii) a static piston that is coupled to the cylinder assembly, such that the static piston remains stationary, and (iii) an inner cylinder that is coupled to the secondary piston and slidable about an exterior surface of the static piston, wherein applying the balancing force on the secondary piston comprises:
applying the balancing force to the inner cylinder, which transmits the balancing force to the secondary piston.

11. The method of claim 10, wherein providing fluid to the force-balance chamber comprises:
providing fluid from the third chamber through one or more cross-holes and a longitudinal channel formed in the static piston to the force-balance chamber as the secondary piston extends; and
applying the balancing force on the secondary piston to oppose the extension fluid force applied to the secondary piston by fluid in the third chamber.

* * * * *